Fig. 1.

UNITED STATES PATENT OFFICE.

WILLIAM R. BURROWS, OF NEWARK, NEW JERSEY.

MACHINE FOR THE MANUFACTURE OF VACUUM-RECEPTACLES.

1,156,971.  Specification of Letters Patent.  Patented Oct. 19, 1915.

Application filed March 14, 1911. Serial No. 614,288.

*To all whom it may concern:*

Be it known that I, WILLIAM R. BURROWS, a citizen of the United States, and a resident of Newark, in the county of Essex and State of New Jersey, have invented certain new and useful Improvements in Machines for the Manufacture of Vacuum-Receptacles, of which the following is a specification.

The invention relates to a novel machine for the manufacture of vacuum receptacles of the character comprising an inner receptacle or bottle member and an outer receptacle or bottle member separated by a space from each other and out of contact with each other except at their lip edges where they are fused together, a vacuum being formed in the chamber between the two members.

It has been customary in the formation of vacuum receptacles, especially when they are of considerable size, to interpose supporting studs or the like between the lower portions of the members thereof for aiding in enabling the inner or receiving member to resist strains.

My invention pertains more particularly to a novel machine for aiding in the closing of the lower skirt portion of the outer receptacle or bottle member with relation to the closed bottom of the inner receptacle or bottle member and in the formation of the usual hole in the lower portion of the outer member through which the vacuum is created. My invention is therefore confined to the treatment of the lower end of the outer member for its formation to inclose the lower end of the inner member, said members when applied to my present machine having been already connected together at their lip edges by preceding stages in the process of manufacture.

In its preferred form the machine of my present invention comprises a rotary frame carrying a plurality of chuck mechanisms adapted to engage the sides and lower end of the outer receptacle members, and means for rotating said mechanisms when the frame is at its at-rest positions adjacent to burners for directing flames against the lower skirt portion of the outer bottle members, said chuck mechanisms being in themselves at rest when said rotary frame is in motion. I preferably provide the rotary frame with four chuck mechanisms, so that at least three of the pairs of bottle members may, in the at rest periods of the rotary frame, be rotated in the presence of flames from the gas-burners, while the fourth chuck mechanism is at the front of the machine in position for the removal of a completed receptacle and the reception of a pair of connected members to be carried on the next intermittent movement of the rotary frame to a burner. The chuck mechanisms are of special character and adapted to engage the outer receptacle members at their lower edges and also at their upper side portions. The gas burners which first act upon the outer bottle members are for heating the glass thereof preparatory to the action on the glass of the final burner, at which the important work is performed, a water cooled hand tool being employed during the rotation of the bottle members at said final burner to close the lower skirt of the outer member uniformly below the closed bottom of the inner member. I also provide means for heating a special spot in the lower wall of the outer member and admitting compressed air to within said member so that it may blow a hole through the same at said spot, the glass being blown outwardly to form a hole and leave an outwardly projecting flange surrounding the same. During the operation of forming the hole in the lower wall of the outer bottle member, the power is cut off from the chuck mechanism holding that special bottle so as to interrupt the rotation of the same.

The invention will be fully understood from the detailed description hereinafter presented, reference being had to the accompanying drawings, in which:

6 is a detached sectional view of a portion of the machine utilized for admitting compressed air within the chamber formed in the outer bottle member during one stage of the operation of completing the bottle; Fig. 7 is a horizontal section, through the lower portion of the outer bottle member and illustrates the support for said member and also a table adjacent thereto for directing the flame used for softening the glass to the proper location against the same; Fig. 8 is a detached side elevation, partly in section, of the bottle members, with the table and a portion of the gas burner shown in Fig. 7, the outer member of the bottle being illustrated as having been partly, at its lower portion, worked under the inner bottle member by manual manipulation against the softened glass of a water-cooled tool represented in Fig. 9 in perspective; Fig. 10 is a detached side elevation, partly in section, of the bottle showing a further stage of the process of its manufacture, consisting in the formation in one side of the bottom of the outer member of a small aperture surrounded by an outwardly projecting flange, Fig. 10 also showing a jet gas burner used for heating the glass at the point where the hole is to be formed, so that compressed air admitted within the outer bottle member may blow said hole therein and in an outwardly direction; and Fig. 11 is a detached side elevation, partly broken away, of the bottle after the lower portion of the outer member has been completely closed in below the inner bottle member.

In the drawing, 15 designates the table or bed-plate of the machine, 16 a horizontal rotary frame supported above said bed-plate, and 17 a vertical shaft having mounted upon its upper end said frame 16. The frame 16 is shown as a spider frame comprising four equally spaced apart radial arms numbered, respectively, 18, 19, 20, 21, and said frame is to be rotated or moved by hand, being given a one-quarter turn at each movement and yieldingly locked at the end of each movement by the spring latch 22 arranged to engage a shoulder 23 on the outer end of the said arms as the latter are moved against it. While each arm of the frame 16 is formed with a shoulder 23, one latch 22 is sufficient to hold the entire frame stationary during its at rest periods.

Figures 3, 4, 5:
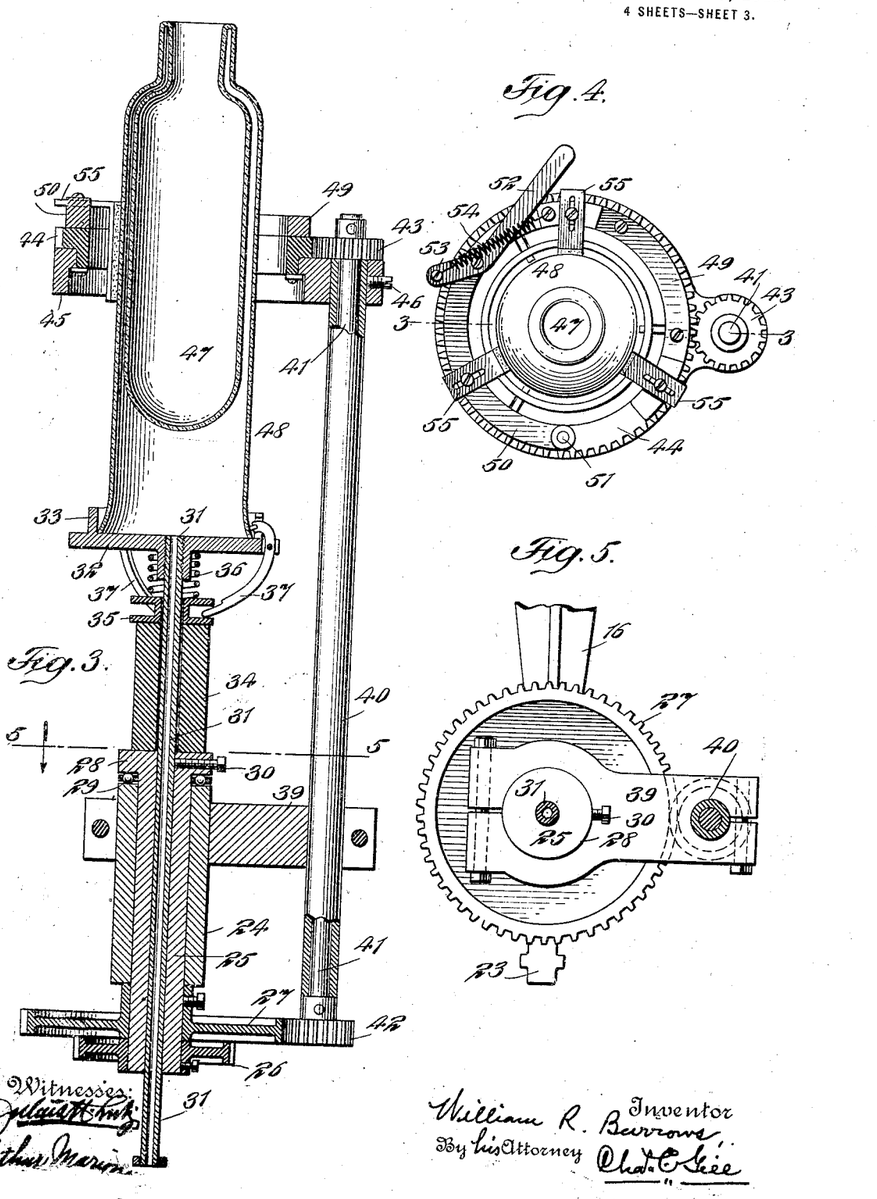
Fig. 3 is a vertical section on a larger scale than Figs. 1 and 2, of one of the rotary chuck mechanisms for receiving and holding the outer bottle blanks or members preparatory to the closing of the lower portions of the same below the inner bottle members.
Fig. 4 is a top view of the same.
Fig. 5 is a horizontal section of the same on the dotted line 5—5 of Fig. 3; Fig.

Each arm of the frame 16 is formed near its outer end with a vertical bearing sleeve 24 containing a rotary sleeve 25 (Fig. 3) upon whose lower end are secured the gear wheels 26, 27 and whose upper end is formed with an annular shoulder 28 and supported on ball bearings 29 at the upper end of the sleeve 24. Each sleeve 25 has secured within it by a screw 30 a tubular rod 31 which is normally open at both ends and has secured upon its upper end a disk 32 provided with an upwardly extending circular flange 33 forming a cup adapted to receive the lower edges of the outer bottle member, as shown in Fig. 3.

Upon the tubular rod 31 above the sleeve 24 is a loose spool 34, and upon said rod above this spool is an annularly grooved disk 35 which is normally pressed downwardly against the spool by means of a coiled spring 36 encompassing the rod and a hub receiving the same formed on the disk 32. I provide the disk 32 with a series, say three, of pivoted radial clutch arms 37 whose lower ends turn inwardly and enter the annular groove in the disk 35, and whose upper ends turn inwardly through slots in the flange 33 for the purpose of engaging the lower edges of the outer bottle member and clamping the same firmly within the cup formed by the disk 32 and flange 33. When it is desired to insert the bottle member within the flange 33, the operator will take hold of the spool 34 and press the same upwardly in opposition to the stress of the spring 36 and thereby cause the lower ends of the arms 37 to move inwardly toward each other and the upper ends of said arms to turn outwardly to their open position to admit the lower edges of the outer bottle member between them, after which the spool 34 is released and the spring 36 will move said spool and disk 35 downwardly and the latter by moving against the lower ends of the arms 37 will cause said arms to move outwardly at their lower ends from each other and the upper ends of said arms to turn inwardly against and clasp the lower edges of the outer bottle member.

Each sleeve 24 of each arm of the frame 16 has a clamped on it a horizontal bar 39 (Figs. 3 and 5) standing preferably at right angles to the frame-arm and having secured to its outer end a vertical tubular rod 40 within which is mounted a vertical shaft 41 carrying at its lower end a pinion wheel 42 in constant mesh with the aforesaid gear wheel 27 and at its upper end a pinion wheel 43 in constant mesh with a ring gear wheel 44 which is rotatably mounted in a horizontal open frame 45 supported from the tubular rod 40 and secured thereto by a set screw 46. The ring gear wheel 44 and frame 45 concentrically encircle the bottle members 47, 48 and are above the gear wheel 27. The inner bottle member 47 has in the condition of the manufacture shown in Fig. 3 been fused at its lip edge to the lip edge of the outer bottle member 48 and is supported by the outer bottle member. The outer bottle member 48 has an open lower end resting upon the disk 32, and the upper portion of the outer bottle member is held within the ring gear wheel 44 and frame 45 by a clamping mechanism secured to said ring gear wheel and comprising (Figs. 3 and 4) a stationary arc-shaped bar 49 an arc-shaped bar 50, pivoted at one end, at 51, a handle lever 52 pivoted to the other end of said bar 50 and having a deflected arm 53 connected by a spring 54 with one end of the bar 49, and a series of preferably three radially adjustable clamp bars or plates 55, faced preferably with asbestos where they engage the bottle member 48. In Fig. 4 I show the clamping mechanism carried by the ring gear wheel 44 in its closed condition securely holding the outer bottle member 48, the pivoted bar 50 being held in its closed position by the spring 54. When it is desired to open the clamping mechanism to release a bottle or to insert a bottle for treatment by the present machine, the handle 52 will, looking at Fig. 4, be turned outwardly so as to move the deflected arm 53 thereof inwardly toward the bottle and then around toward the stationary end of the spring, the deflected portion 53 of the lever when in the condition just stated, serving in effect as a link extending from the end of the bar 50 and permitting the free end of the latter to open outwardly far enough to release the clamp 55 carried by said bar 50 from the bottle.

Figure 1:
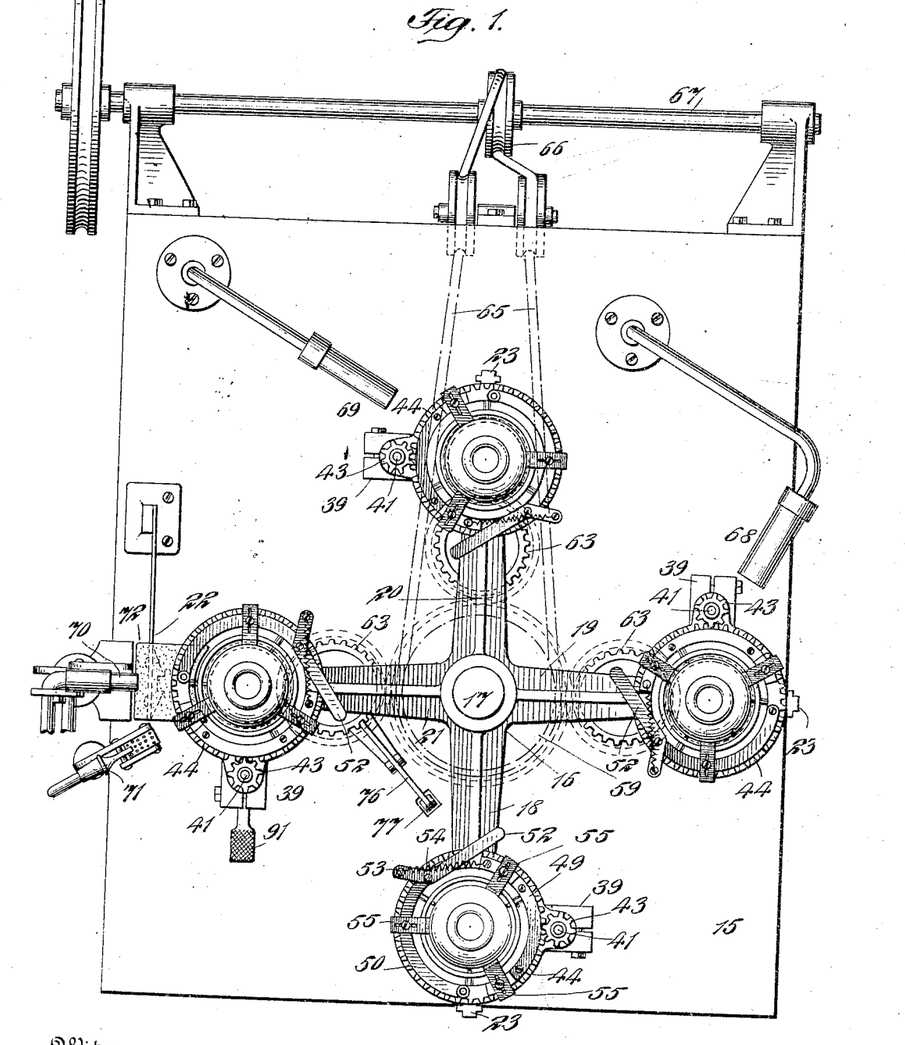
Figure 1 is a top elevation of a machine constructed in accordance with and embodying the invention.
Figure 2:
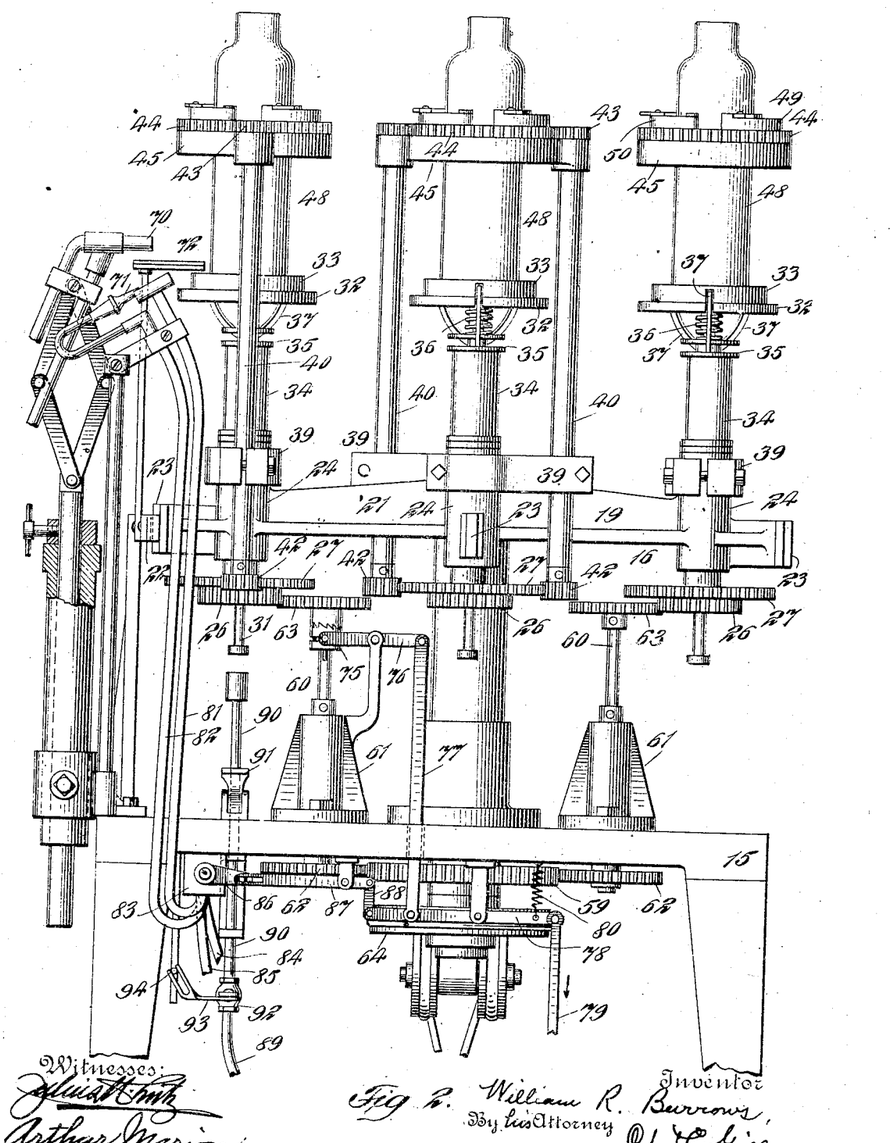
Fig. 2 is a front elevation, partly in section and partly broken away, of the same.

Each arm of the frame 16 is equipped with the mechanism I have just described comprising (Fig. 3) the bearing sleeve 24, rotary sleeve 25, gear-wheels 26, 27, tubular rod 31, disk 32, spool 34, annularly grooved disk 35, spring 36, clutch arms 37, bar 39, rods 40, 41, pinion wheels 42, 43, ring gear-wheel 44, open frame 45 and the clamping devices secured on said ring gear-wheel, and said mechanism may be conveniently considered as a rotary chuck-mechanism for vertically holding and rotating the connected bottle members 47, 48. There will be no rotation of the chuck and bottle members, however, except when the gear-wheel 26 of a chuck mechanism is in engagement with a driving gear-wheel of the driving mechanism. When the frame 16 is being moved on its quarter-turns, all the chuck-mechanisms are in themselves at rest, and in the machine presented herein when the frame 16 is at its at-rest periods, all of the chuck-mechanisms will be in rotation with the exception of the one then at the front of the machine, that one being idle to permit the attendant to withdraw therefrom the bottle then completed so far as the present machine is concerned and insert therein bottle members of the character shown in Fig. 3 to have the lower end of the outer member treated to convert the same to the condition shown in Fig. 11. The mechanisms for driving the chuck mechanisms with the exception of the front one of said mechanisms, at the at-rest periods of the frame 16, may be understood from Figs. 1 and 2 and comprise a main driving gear-wheel 59 preferably located below the bed-plate or table 15, a series of three vertical shafts 60 extending through the bed-plate 15 and mounted in vertical bearings 61 upon said bed-plate, gear wheels 62 secured on the lower ends of said shafts 60 and always in mesh with said gear-wheel 59, and gear wheels 63 upon the upper ends of said shaft 60, said shafts 60 and gear-wheels 63 being so positioned with relation to the chuck mechanisms carried by the frame 16 that when said frame is moved to an anti-rest position, such as illustrated in Fig. 1, the gear-wheels 26 thereof will move into engagement with the gear-wheels 63 and be rotated thereby. There are four chuck mechanisms carried by the frame 16, but I provide only three shafts 60 carrying gear-wheels 63, and hence when the frame 16 is moved to an at-rest position, the two side and one rear chuck mechanisms will be set in rotation from the wheels 63, while the front chuck mechanism will remain idle, so that as hereinbefore explained the operator may withdraw the bottle therefrom and insert bottle-members thereto. The gear-wheels 63 may have a constant rotation but have no influence on the chuck-mechanisms carried by the frame 16, except when said frame is at an at-rest position. The gear-wheel 59 drives the gear-wheels 62, shafts 60 and gear-wheels 63 and it is driven from a pulley-wheel 64 around which a belt 65 leading from a pulley-wheel 66 on the main driving shaft 67 passes.

The rotation of a gear-wheel 26 of a chuck mechanism from a gear wheel 63 results in the rotation of the sleeve 25 and parts connected therewith and actuated therefrom. The rotation of the sleeve 25 results in the tubular rod 31, to which it is connected, being rotated, and since the disk 32 is connected with said rod 31, said disk and the clutch arms 37 will rotate therewith and with the lower end of the outer bottle member 48. The gear-wheel 27 is secured to the sleeve 25, as shown in Fig. 3, and hence when said sleeve is rotated said gear-wheel 27 will also rotate and impart rotary movement to the gear wheel 42, rod or shaft 41 and gear wheel 43, and at the same time the wheel 43 will impart motion to the ring gear-wheel 44, causing the latter to rotate in time with the rotation of the rod 31 and gear-wheel 27 and imparting through the clamping mechanisms carried by it rotary movement to the outer bottle-member 48. When therefore the frame 16 is at its at-rest positions, three of the chuck-mechanisms just hereinbefore described, such mechanisms being duplicated for each arm of the frame 16, will be in motion or driven by the gear-wheels 63, while the other chuck mechanism will stand idle at the front of the machine to permit the removal of one bottle and the insertion of bottle blanks for treatment.

Figures 6, 7, 8, 9, 10, 11:
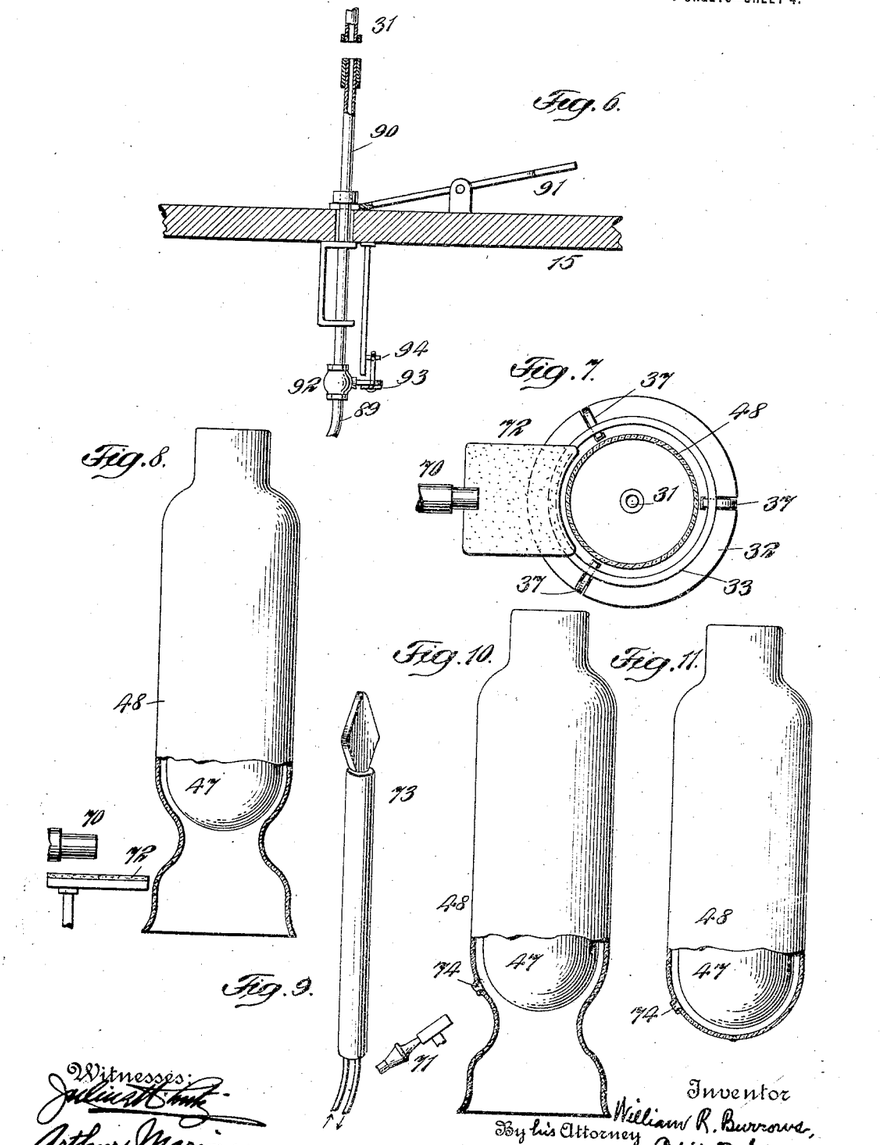

The bottle members 47, 48 will initially be in the condition shown in Fig. 3, said members having been fused together at their lip edges, and the member 48 being formed with a downwardly extending skirt portion projecting below the bottom of the member 47. The bottle members are introduced to the chuck mechanisms of the frame 16 as said mechanisms come to rest at the front of the machine, and during the intermittent rotary movement of the frame 16 the bottle members are carried first to a position adjacent to a gas burner 68, then to a position adjacent to a gas burner 69, and then to a position adjacent to a Bunsen burner 70 and auxiliary burner 71. The burners 68, 69 direct their flames against the lower portion of the bottle member 48 and properly heat the same preparatory to the softening and treatment of said portion of the bottle member upon arriving opposite to the burner 70. The bottle members are rotated when the frame 16 is at its at-rest positions, with the exception of the bottle held idle at the front of the machine, and hence the flames from the burners may uniformly act upon the bottle member 48. The only effect of the burners 68, 69 is the proper preparatory heating of the lower portion of the bottle member 48, but when said member is adjacent to the burner 70 and subjected to the stronger heat flame, the skirt portion of said bottle member must be worked under the inner bottle member and finally become closed, as I illustrate in Figs. 8, 10 and 11. The burner 70 has just below it an asbestos covered table 72, which serves to confine the heating action of the burner 70 to the proper portion of the skirt of the bottle member 48. During the rotation of the bottle members when in position adjacent to the burner 70, the operator, by means of a water-cooled tool 73, will work the skirt of the bottle member 48 below the member 47, as illustrated in Fig. 8, and after this work has proceeded a suitable length of time, the operation of forming the aperture or hole 74 surrounded by an outwardly extending flange will be performed, and during the formation of the hole 74 I preferably turn off the gas from the burner 70 and arrest the bottle members and ignite the gas at the jet burner 71. In arresting the bottle members held adjacent to the burners 70, 71, without disturbing the bottle members adjacent to the burners 68, 69, I disengage the clutch 75 (Fig. 2) from the left hand gear wheel 63 so that said wheel may run idly and therefore not impart motion to the gear wheel 26 connected with the left hand chuck mechanism. The clutch 75 may be moved from engagement with the gear wheel 63 by means of a pivoted lever 76, vertical link 77 connected therewith, pivoted lever bar 78 to which the lower end of said link is pivotally connected, and a power rod 79 pivoted to one end of the lever 78 and adapted to be moved by means of a treadle (not shown), by hand, or otherwise. A spring 80 serves to hold the lever 78 and parts connected with it in their initial normal position, with the clutch 75 connecting the shaft 60 with the gear wheel 63. I also utilize the pivoted lever 78 as a means for turning on the air and gas to the burner 71, said burner being supplied from the pipes or tubes 81, 82, leading from a valve 83 which is supplied with the air and gas through pipes 84, 85, and is operable by a crank arm 86 connected with a pivoted lever arm 87 which is connected with the aforesaid lever arm 78 by means of a link 88. The movement of the lever arm 78 to disengage the clutch 75 and cut off rotary movement from the left hand bottle members, operates at the same time through the link 88, pivoted lever arm 87 and crank arm 86, to open the passage through the valve 83 so that air and gas may pass through the pipes 81, 82 to the burner 71. When the lever arm 78 is released to return to its normal position under the action of the spring 80, it automatically closes the valve 83 and cuts off the supply of gas and air to the burner 71.

The burner 71 is a jet burner and it is used exclusively for softening a small spot in the bottle member 48 sufficient for the formation of the hole 74 and its surrounding flange, and after the flame from the burner 71 has sufficiently acted on the glass, I admit compressed air to within the bottle member 48 so that at the spot softened and weakened by the action of the flame from the burner 71, the air may blow through the wall of the member and form the hole or aperture 74 with its outwardly projected flange. The compressed air is admitted to the outer bottle member 48 through the tubular rod 31 and is supplied from any suitable source through a pipe or tube 89 (Figs. 1 and 6) connected with a vertically slidable pipe 90 adapted for vertical movement by the manual action of a lever 91 and having at its lower end a valve 92 for controlling the passage therethrough. The pipe 90 extends through the bed plate 15 and is supported therefrom directly below the tubular rod 31, said pipe normally not being in connection with said tubular rod. When the pipe 90 is in its lower position, shown in Figs. 2 and 6, the valve 92 stands closed, but when said pipe is elevated by means of the lever 91, the valve is opened by means of a crank arm 93 connected therewith, becoming arrested by a stationary pin 94 during the upward movement of said pipe, with the result that when the upper end of the pipe 90 meets and presses against the lower end of the tubular rod 31, the valve 92 will have been opened and the compressed air may flow through the same and the pipe 90 and tubular rod 31 into the outer bottle member 48. The compressed air within the bottle member 48 will seek the weakest spot for its escape, and this spot will be the one thoroughly softened by the action of the flame from the burner 71. After the hole 74 has been formed by the discharging air, the pipe 90 will be lowered, thereby effecting the closing of the valve 92 and the cutting off of the compressed air, and the use of the burner 71 will cease until another pair of bottle members reach this location and require the formation of the hole 74. After the hole 74 has been formed the spring 80 will be permitted to reset the clutch 75 so that the rotation of the bottle members may be renewed, and at this time the burner 70 is again placed in action and the operator by means of the tool 73 will continue the manipulation of the skirt of the bottle member 48 until the same has entirely closed below the inner bottle member or reached the condition shown in Fig. 11, which shows the outer bottle member as having been completely formed below the inner bottle member and separated therefrom by a substantially uniform space.

The upper or lip edges of the bottle members may be secured together in any convenient way or by any convenient means, but I recommend for the purpose the use of a machine of the character described and claimed in an application, Serial Number 614,299, for Letters Patent filed by me concurrently herewith. I desire it to be understood that I do not limit my invention to the details of construction hereinbefore described since the same may be variously modified within the scope of the claims. I prefer to employ a rotary frame employing four chuck mechanisms, as shown, since by reason thereof two pairs of bottle members may be subjected to preparatory heating while one pair of bottle members is receiving final treatment. I have found that with the employment of a rotary frame employing four chuck mechanisms the bottles may be manufactured accurately and with considerable rapidity, and a greater output secured than would be possible with the use of a single chuck mechanism or two chuck mechanisms. I do not however limit the invention, in its broader scope, to the employment of any special number of chuck mechanisms, since the number shown may obviously be increased or diminished.

What I claim as my invention and desire to secure by Letters Patent, is:

1. In a machine for aiding in the closing together of the lower portion of the side walls of a partly formed outer member of a vacuum-receptacle below and spaced from the closed bottom of the inner member thereof, a chuck-mechanism having means to engage the sides of said outer member, a supporting mechanism to receive the lower end of said outer member at a distance below said inner member, means for rotating said mechanisms and the members carried thereby, a burner for directing a flame against said lower portion of the outer member during such rotation, whereby a tool may be applied for moving the softened lower wall portions of the outer member inwardly during such rotation, to close the same together below said inner member, means for temporarily arresting the rotation of said mechanisms and members prior to the closing of the lower end of the outer member, a jet-burner for softening a spot in the lower part of said outer member, and pneumatic means for forming a hole through the same at said spot.

2. In a machine for aiding in the closing of the lower portion of the outer member of a vacuum-receptacle with relation to the closed bottom of the inner member thereof, a chuck mechanism comprising a ring gear wheel adapted to receive within it the outer receptacle-member containing the inner member and having releasable clamping means for engaging the side surfaces of the same, a frame supporting said ring gear wheel, a support for the lower open end of said outer member, a rod (31) constituting a part of said support, a sleeve (25) connected with said rod, a gear wheel connected with said sleeve, means for imparting rotary motion to said gear wheel, and a rod having pinions in mesh with said gear wheel and said ring gear wheel for assuring simultaneous rotation of said clamping means and said support, combined with a burner for directing a flame against the lower portion of said outer member during its rotation for enabling the closing inwardly of the same by an applied tool.

3. In a machine for aiding in the closing of the lower portion of the outer member of a vacuum-receptacle with relation to the closed bottom of the inner member thereof, a chuck mechanism comprising a ring gear wheel adapted to receive within it the outer receptacle-member containing the inner member and having releasable clamping means for engaging the side surfaces of the same, a frame supporting said ring gear wheel, a support for the lower open end of said outer member, a manually releasable clutch mechanism for engaging the lower edge of said outer member and connecting the same with said support, a rod (31) constituting a part of said support, a sleeve (25) connected with said rod, a gear wheel connected with said sleeve, means for imparting rotary motion to said gear wheel, and a rod having pinions in mesh with said gear wheel and said ring gear wheel for assuring simultaneous rotation of said clamping means and said support, combined with a burner for directing a flame against the lower portion of said outer member during its rotation for enabling the closing inwardly of the same by an applied tool.

4. In a machine for aiding in the closing of the lower portion of the outer member of a vacuum-receptacle with relation to the closed bottom of the inner member thereof, a chuck mechanism comprising a ring gear wheel adapted to receive within it the outer receptacle-member containing the inner member and having releasable clamping means for engaging the side surfaces of the same, a frame supporting said ring gear wheel, a support for the lower open end of said outer member, clutch arms pivoted to said support and adapted at their upper ends to engage the lower part of said outer member for connecting the same with said support, a vertically movable disk engaging the lower ends of said clutch arms for operating the same, a spring acting against said disk to close said arms against the receptacle-member, a spool below said disk for manual movement against the same to open said arms from said member, a rod (31) constituting a part of said support, a sleeve (25) connected with said rod, a gear wheel connected with said sleeve, means for imparting rotary motion to said gear wheel, and a rod having pinions in mesh with said gear wheel and said ring gear wheel for assuring simultaneous rotation of said clamping means and said support, combined with a burner for directing a flame against the lower portion of said outer member during its rotation for enabling the closing inwardly of the same by an applied tool.

5. In a machine for aiding in the closing of the lower portion of the outer member of a vacuum-receptacle with relation to the closed bottom of the inner member thereof, a chuck mechanism comprising a ring gear wheel adapted to receive within it the outer receptacle-member containing the inner member and having releasable clamping means for engaging the side surfaces of the same, a frame supporting said ring gear wheel, a support for the lower open end of said outer member, a tubular rod (31) constituting a part of said support, a sleeve (25) connected with said rod, a gear wheel connected with said sleeve, means for imparting rotary motion to said gear wheel, and a rod having pinions in mesh with said gear wheel and said ring gear wheel for assuring simultaneous rotation of said clamping means and said support, combined with a burner for directing a flame against the lower portion of said outer member during its rotation for enabling the closing inwardly of the same by an applied tool, means for temporarily arresting the rotation of said chuck-mechanism and members prior to the closing of the lower end of the outer member, a jet-burner for softening a spot in the lower part of said outer member, and means for directing air under pressure through said tubular rod to within said outer member for blowing a hole outwardly through the same at said spot.

6. In a machine for aiding in the closing of the lower portion of the outer members of vacuum-receptacles with relation to the closed bottoms of the inner members thereof, a rotary frame having a plurality of rotary chuck-mechanisms each adapted to engage an outer receptacle member containing an inner member, means for imparting rotary movement to said mechanisms and the receptacle-members carried thereby less the mechanism carrying the receptacle whose outer member has had its bottom closed, when said frame is at its at-rest positions, and burners mounted to direct their flames against the lower portion of the outer members during such rotation, the final burner being adapted to sufficiently soften the glass to enable the closing-in of such lower portion by an applied tool, combined with means for temporarily arresting the rotation of the chuck mechanism at said final burner prior to the complete closing of the lower end of the outer receptacle-member, a jet-burner for softening a spot in the lower part of said outer member when the latter is at rest, and means for directing air under pressure within said outer member for blowing a hole outwardly through the same at said spot.

7. In a machine for aiding in the closing of the lower portion of the outer members of vacuum-receptacles with relation to the closed bottoms of the inner members thereof, a rotary frame having a plurality of rotary chuck-mechanisms each adapted to engage an outer receptacle member containing an inner member and hold the same vertically and having a driving gear-wheel at its lower end, a driving mechanism having gear wheels positioned to engage and drive the gear-wheels of said chuck mechanisms at the at-rest positions of said rotary frame, and burners mounted to direct their flames against the lower skirt portions of the outer receptacle-members during their rotation with said chuck-mechanisms, the final burner being adapted to effect sufficient softening of the glass to enable the closing-in of the same by an applied tool, combined with means for temporarily arresting the rotation of the chuck mechanism at said final burner prior to the complete closing of the lower end of the outer receptacle-member, a jet-burner for softening a spot in the lower part of said outer member when the latter is at rest, and means for directing air under pressure within said outer member for blowing a hole outwardly through the same at said spot.

Signed at New York in the county of New York and State of New York this 13th day of March A. D. 1911.

WILLIAM R. BURROWS.

Witnesses:
CHAS. C. GILL,
ARTHUR MARION.